United States Patent
McKee et al.

(10) Patent No.: US 12,223,471 B2
(45) Date of Patent: *Feb. 11, 2025

(54) PRESENCE AND COLLABORATION TOOLS FOR BUILDING INFORMATION MODELS

(71) Applicant: Procore Technologies, Inc., Carpinteria, CA (US)

(72) Inventors: Kevin McKee, Del Mar, CA (US); Ben Burlingham, Carpinteria, CA (US)

(73) Assignee: Procore Technologies, Inc, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,113

(22) Filed: Dec. 28, 2023

(65) Prior Publication Data

US 2024/0232808 A1 Jul. 11, 2024

Related U.S. Application Data

(63) Continuation of application No. 16/825,812, filed on Mar. 20, 2020, now Pat. No. 11,900,322.

(51) Int. Cl.
*G06T 17/10* (2006.01)
*G06F 30/13* (2020.01)
(Continued)

(52) U.S. Cl.
CPC .......... *G06Q 10/103* (2013.01); *G06F 30/13* (2020.01); *G06T 17/10* (2013.01); *G06T 17/20* (2013.01)

(58) Field of Classification Search
None
See application file for complete search history.

(56) References Cited

U.S. PATENT DOCUMENTS 6,057,856 A   5/2000  Miyashita et al.
10,929,723 B2 * 2/2021  Kodera ................... G06F 18/22
(Continued)

FOREIGN PATENT DOCUMENTS

CN        112100705 A  * 12/2020  ............. G06Q 50/08

OTHER PUBLICATIONS

PCT International Searching Authority, International Search Report and Written Opinion mailed on Jul. 13, 2021, issued in connection with International Application No. PCT/US2021/023209, 9 pages.
(Continued)

*Primary Examiner* — Saptarshi Mazumder
(74) *Attorney, Agent, or Firm* — Lee Sullivan Shea & Smith LLP

(57) ABSTRACT

Facilitating collaboration on a 3D model of a construction project involves obtaining presence information that identifies each individual concurrently interacting with a respective rendered 3D model of the construction project via a respective client station and indicates a respective position and orientation at which the respective rendered 3D model is being rendered. Based on the presence information, a first client station presents a view of a first rendered 3D model including a visual representation of a second individual concurrently interacting with a second rendered 3D model and indicating the position and orientation of the second rendered 3D model. Based on a change in one or both of the position or orientation of the second rendered 3D model, the presence information is updated. The first client station updates the view of the first rendered 3D model to reflect the change in the position or orientation of the second rendered 3D model.

20 Claims, 6 Drawing Sheets

(51) Int. Cl.
G06Q 10/10 (2023.01)
G06T 17/20 (2006.01)

(56) References Cited

U.S. PATENT DOCUMENTS

| | | | |
|---|---|---|---|
| 2009/0113326 A1* | 4/2009 | Miyamoto | A63F 13/65 |
| | | | 715/764 |
| 2011/0137945 A1 | 6/2011 | Sandblom | |
| 2013/0120367 A1* | 5/2013 | Miller | G06T 19/00 |
| | | | 345/419 |
| 2014/0025529 A1 | 1/2014 | Honeycutt et al. | |
| 2015/0172418 A1* | 6/2015 | Davis | G06F 16/444 |
| | | | 709/203 |
| 2016/0182412 A1* | 6/2016 | Kabbes | G06Q 10/10 |
| | | | 709/206 |
| 2018/0330542 A1 | 11/2018 | Bharti et al. | |
| 2019/0098255 A1 | 3/2019 | Bergmann et al. | |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.
European Extended Search Report, EP Application No. 21770762.9, dated Mar. 14, 2024, 8 pages.

* cited by examiner

PRESENCE AND COLLABORATION TOOLS FOR BUILDING INFORMATION MODELS

CROSS-REFERENCE TO RELATED APPLICATIONS

This application is a continuation of U.S. application Ser. No. 16/825,812, filed on Mar. 20, 2020, and titled "Presence and Collaboration Tools for Building Information Models," the contents of which are incorporated by reference herein in their entirety.

BACKGROUND

Construction projects are often complex endeavors involving the coordination of many professionals across several discrete phases. Typically, a construction project commences with a design phase, where architects design the overall shape and layout of a construction project, such as a building. Next, engineers step in during a planning phase where they take the architects' designs and produce engineering drawings and plans for the construction of the project. At this stage, engineers may also design various portions of the project's infrastructure, such as HVAC, plumbing, electrical, etc., and produce plans reflecting these designs as well. After, or perhaps in conjunction with, the planning phase, contractors may step in during a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

Although this is a simplified overview of what is a complex and iterative procedure, it is clear that in order to successfully complete a construction project, many separate teams of individuals must communicate and coordinate their efforts over a long period of time. Thus, any tool that can make portions of this process more efficient is desired.

OVERVIEW

Generally speaking, in the field of construction, a construction project may involve the creation, review, and sometimes revision, of plans of the construction project. These plans may comprise visual representations of the construction project that visually communicate information about the construction project, such as how to assemble or construct the project. Such visual representations tend to take one of at least two different forms.

One form may be a two-dimensional ("2D") model, such as an architectural drawing, a construction blueprint, engineering schematics (or the like), in which 2D line segments of the 2D model represent certain physical elements of the construction project (e.g., walls, ducts, etc.). In this respect, a 2D model may be embodied either in paper form or in a computerized form, such as an image file (e.g., a PDF, JPEG, etc.).

2D models have some advantages. For instance, they are often set out in a universally-recognized format that most, if not all, construction professionals can read and understand. Further, they are designed to be relatively compact, with one drawing being arranged to fit on a single piece of paper or in a computerized file format that requires minimal processing power and computer storage (e.g., a PDF viewer, JPEG viewer, etc.).

Yet, 2D models have disadvantages as well. For instance, it often takes multiple drawings in order to visually communicate an overview of an entire construction project. This is due to the fact that 2D models tend not to efficiently present information about the construction project from a third (e.g., vertical) dimension. Typically, a construction project may have at least one 2D model per floor of the construction project. Thus, for a construction project spanning, say, ten floors, the construction project will have at least ten 2D models, and perhaps more to fully visually communicate the various aspects of the construction project.

To advance over 2D models, computerized, three-dimensional ("3D") technology was developed as another form in which information about a construction project can be visually communicated. In this respect, a 3D model of the construction project is typically embodied in a computerized form, such as in a Building Information Model ("BIM") file, with 3D meshes visually representing the physical elements of the construction project (e.g., walls, ducts, ceilings, pipes, conduits, etc.). The BIM file can include a vast amount of data describing the individual physical elements of the construction project and the relationships between these individual physical elements, including for instance, the relative position, size, and/or shape of each element, and an indication of where each element will reside in relation to the other elements in the construction project.

Correspondingly, specialized software has been developed that is capable of accessing a BIM file and rendering a 3D model of the construction project from one or more perspectives. One type of specialized software tool that currently exists is known as a "BIM viewer." Generally speaking, the BIM viewer is a software application that accesses the information contained within a BIM file (or a combination of BIM files) for a particular construction project and then, based on that file (or those files), is configured to cause a client station (e.g., a desktop computer, a laptop, a tablet, or the like) to render a 3D model of the computerized representation of the construction project. The BIM viewer tool may also facilitate navigation of the rendered 3D model of the construction project. For example, the BIM viewer tool may facilitate navigation of the 3D model by adjusting the perspective along either or both of the lateral axes, adjusting the perspective directly along the vertical axis, and/or by adjusting the orientation of the perspective along the two lateral axes and the vertical axis.

In practice, BIM files and rendered 3D models based on such BIM files may be used throughout the construction planning process by many different construction professionals in order to provide a visualization of the construction project. The process for creating a BIM file may involve input from various different individuals (or different teams of individuals), who have various different roles with respect to the process of creating the BIM file.

For example, a structure team may create a BIM file that models the walls, floors, and ceilings of the construction project, an HVAC team may create another BIM file that models the HVAC equipment and associated ductwork throughout the construction project, and a plumbing team may create yet another BIM file that models the plumbing systems of the construction project. Another team of individuals—which may be referred to as the virtual design and construction ("VDC") team—may then take all of these disparate BIM files and assemble them into a single combined BIM file that reflects the entire construction project.

However, after combining the disparate BIM files into the combined BIM file and reviewing the combined BIM file in BIM viewer software, an individual (such as a VDC team member) may identify one or more problems with the combined BIM file, such as an unintended intersection between two meshes, insufficient clearance between two meshes, or meshes that are missing, misshapen, or are otherwise ill-positioned in the construction project, among other examples. Such problems may be referred to herein as "coordination issues."

Once a coordination issue with the combined BIM file is identified, the VDC team may then be tasked with developing a plan to resolve the coordination issue. In this respect, it may be possible for the VDC team to resolve some types of coordination issues itself, without involving other individuals or teams of individuals. For example, a coordination issue identified in the combined BIM file could be the result of a simple error by one of the individuals that created the underlying BIM files, in which case the VDC team may be able to resolve the coordination issue without involving others. However, other types of coordination issues may require the VDC team to get another individual (or team of individuals) involved before the VDC team can resolve the coordination issue. For example, a coordination issue identified in the combined BIM file may require a change to contract documents and/or a change to the scope of work between a general contractor and an owner of the construction project, in which case the VDC team would typically need to get one or more other individuals (or teams of individuals) involved before the coordination issue can be resolved.

The process for identifying and resolving a coordination issue in a combined BIM file (or the like) generally involves some level of collaboration between multiple different individuals (or teams of individuals). In the course of this collaboration, some or all of the individuals involved may desire to access the combined BIM file in order to render respective a 3D model of a construction project and perhaps make changes or suggested changes to the BIM file in order to address the coordination issue. Existing BIM viewer technology has several limitations, which tends to make this process generally inefficient and results in poor user experience.

First, existing BIM viewer technology generally allows only one individual to access a BIM file at a given time. This limitation results in scenarios in which multiple different individuals may take turns rendering (and perhaps editing) a BIM file. For instance, if a first individual is accessing the BIM file, a second individual may not be able to access the BIM file until the first individual is no longer accessing the BIM file. As such, it is often difficult for multiple different individuals to collaborate with one another, and unnecessary time and effort may be devoted to coordinating when a given individual can access a BIM file.

Second, in some circumstances, construction professionals on different teams may arrange to access multiple copies of BIM files for the same construction project such that a first team is accessing one copy of a BIM file for a particular construction project and a second team is accessing another copy of a BIM file for the particular construction project. But if an individual on one team makes changes to one copy of a BIM file for the particular construction project (e.g., to identify coordination issues that appear in the rendered 3D model of the construction project), this may result in conflicting BIM files for that construction project. Accordingly, unnecessary time and effort may be devoted to reconciling conflicting BIM files for a particular construction project.

As a result of the foregoing limitations and other limitations associated with existing BIM viewer technology, construction professionals often spend many hours coordinating with one another to identify and resolve a coordination issue (or some other problem that arises during construction) and to try to avoid creating conflicting BIM files. For instance, construction professionals may spend a lot of time corresponding with one another to explain when certain individuals plan on accessing a BIM file, what certain individuals plan on doing when they access the BIM file, what a certain individual is doing while accessing the BIM file, and/or what certain individuals did when they accessed the BIM file.

To address these problems (and potentially others), disclosed herein is software technology that facilitates collaboration on a BIM file by enabling multiple individuals to simultaneously access and make changes to BIM files for a particular construction project. The disclosed software technology includes several features that promote efficient collaboration when multiple users are either simultaneously accessing a common BIM file (such as a scenario where multiple users are accessing the same BIM file, which may be stored in a common location like a network share location or a cloud storage location) or simultaneously accessing respective BIM files for the same construction project (such as a scenario where multiple users are accessing local copies of BIM files, where, in practice, the local copies may or may not be exact copies of the same BIM file, but are nonetheless for the same construction project).

At a high level, and in one respect, the disclosed software technology may function to provide "presence information." This presence information may include (1) information identifying each individual that is currently accessing a BIM file, and (2) an indication of how the other individual(s) are currently viewing a rendered 3D model using the BIM file, such as an indicator of another individual's respective position and/or orientation within a respective 3D model of the construction project. Further, as a given individual navigates through its own rendered 3D model, the presence information may be updated in order to track the given individual's updated position and/or orientation.

In another respect, but still at a high level, the disclosed software technology may include one or more collaboration tools, such as a "chat" tool, a "follow" tool, a "tracking" tool, and a "sharing" tool. These tools are described in more detail below.

In one aspect, the disclosed software technology may comprise a front-end portion that may be executed by one or more client stations and a back-end portion that may be executed by a back-end platform. In practice, the front-end portion of the disclosed software technology may be integrated into or otherwise interface with a software application, such as a BIM viewer. Further, in practice, the back-end portion of the disclosed software technology may determine when multiple individuals are accessing a common BIM file (or accessing respective BIM files for the same construction project). The back-end portion may also collect and maintain presence information for each individual accessing a common BIM file (or accessing respective BIM files for the same construction project), and each time the back-end portion collects, via a given individual's client station, an indication of a change to the given individual's position and/or orientation within a rendered 3D model of the construction project, the back-end portion may push updates to respective client stations of other individuals that are also rendering a 3D model of the construction project, so that each of these other individuals may be aware of where the given individual is located within the rendered 3D model of the construction project.

By way of example, presence information may take various forms. As one possibility, as noted above, the presence information may comprise information identifying each individual that is currently accessing the same BIM file. For instance, for each individual that is currently accessing the same BIM file to view a rendered 3D model of a construction project, the presence information may comprise the individual's name (e.g., first name, last name, user name, etc.), an image of the individual (e.g., a profile picture, etc.), a real-time video of the individual, and/or a visual indicator associated with the individual (e.g., an avatar, a color associated with the individual, or the like), among other examples.

It should be understood that the presence information may comprise other information identifying each individual that is currently accessing the BIM file as well. For instance, for each individual that is currently accessing a BIM file to render a 3D model of the construction project, the presence information may comprise an indication of the type of client station (e.g., a desktop, a smart phone, tablet, etc.) associated with the individual that is used to access the BIM file, an indication of where the individual's client station (and the individual) is physically located (e.g., city, street, etc.), and/or an indication of whether the individual is accessing the BIM file from a native application that embodies the disclosed software technology or a web-based application that embodies the disclosed software technology.

As another possibility, as noted above, the presence information may comprise an indication of how the other individual(s) are currently viewing the rendered 3D model, such as an indicator of another individual's respective position and/or orientation within the 3D model of the construction project. For instance, in one example scenario mentioned above, a first individual and a second individual may each access the same BIM file to render a 3D model of the construction project. While the first individual renders a 3D model of the construction project, the first individual's rendered view of the 3D model may comprise an indication of how the second individual is currently viewing its respective 3D model of the construction project, such as an indicator of the second individual's respective position and/or orientation within its respective 3D model of the construction project. Likewise, while the second individual renders a 3D model of the construction project, the second individual's rendered view of the 3D model may comprise an indication of how the first individual is currently viewing its respective 3D model of the construction project, such as an indicator of the first individual's respective position and/or orientation within its respective 3D model of the construction project. The presence information may comprise an indication of how the other individual(s) are currently viewing the rendered 3D model in other example scenarios as well, such as the scenario where multiple users are accessing respective BIM files.

The respective position and/or orientation of each individual that is currently accessing the BIM file may be presented in various manners. As one example, a first individual's view of the rendered 3D model may include (1) a visual indicator of a second individual, such as an avatar of the second individual, that is positioned at a location (and/or perhaps oriented in a direction) corresponding to the second individual's view of the rendered 3D model, and (2) a visual indicator of a third individual, such as an avatar of the third individual, that is positioned at a location (and/or perhaps oriented in a direction) corresponding to the third individual's view of the rendered 3D model. Similarly, the second individual's view of the rendered 3D model may include (1) a visual indicator of the first individual, such as an avatar of the first individual, that is positioned at a location (and/or perhaps oriented in a direction) corresponding to the first individual's view of the rendered 3D model, and (2) a visual indicator of the third individual, such as an avatar of the third individual, that is positioned at a location (and/or perhaps oriented in a direction) corresponding to the third individual's view of the rendered 3D model. Likewise, the third individual's view of the rendered 3D model may include (1) a visual indicator of the first individual, such as an avatar of the first individual, that is positioned at a location (and/or perhaps oriented in a direction) corresponding to the first individual's view of the rendered 3D model, and (2) a visual indicator of the second individual, such as an avatar of the second individual, that is positioned at a location (and/or perhaps oriented in a direction) corresponding to the second individual's view of the rendered 3D model.

Generally speaking, the visual indicator of a given individual may take various forms, examples of which may include an avatar associated with the given individual (as mentioned above), and/or an image associated with the given individual (e.g., a profile picture, an image with the given individual's initials, first name, last name, and/or user name, etc.). One of ordinary skill in the art will appreciate that the visual indicator of a given individual may take various other forms as well.

It should be understood that the respective position and/or orientation of each individual that is currently accessing the BIM file may be presented in various other manners as well. Further, it should be understood that the presence information may take various other forms as well.

As noted above, the disclosed software technology may also include various collaboration tools that may be used by individuals to collaborate with one another. For instance, a given individual may collaborate with one or more other individuals using various collaboration tools to identify and/or resolve a coordination issue. To facilitate such collaboration, the collaboration tools may take various forms.

As one possibility, the collaboration tools may comprise a "chat" tool that enables each individual currently viewing the rendered 3D model of the construction project to chat with other individuals that are also viewing the rendered 3D model of the construction project. The chat tool may take various forms.

As one example, while viewing the rendered the 3D model of the construction project, the chat tool may enable each individual to video chat with one or more other individuals that are also viewing the rendered 3D model of the construction project. In this respect, the chat tool may enable real-time audio and/or video interactions between individuals to facilitate collaboration.

As another example, while viewing the rendered 3D model of the construction project, the chat tool may enable each individual to send messages to one or more individuals that are also viewing the rendered 3D model of the construction project. For instance, the chat tool may enable an individual to send instant messages to another individual viewing the rendered 3D model of the construction project (e.g., a direct message) and/or send instant messages to a group of individuals viewing the rendered 3D model of the construction project (e.g., a group message).

One of ordinary skill in the art will appreciate that the chat tool may take various other forms as well.

As another possibility, the collaboration tools may comprise a "follow" tool that may enable an individual viewing the rendered 3D model of the construction project to monitor another individual's view of the rendered 3D model. For instance, a first individual viewing the rendered 3D model of the construction project may access the follow tool to view the same view of the rendered 3D model as a second individual in which the first individual wishes to monitor, and as the second individual navigates the 3D model to a given location and/or orientation, the first individual's view of the rendered 3D model may be updated to a view that corresponds to that given location and/or orientation within the 3D model.

As yet another possibility, the collaboration tools may comprise a "tracking" tool that enables each individual viewing the rendered 3D model of the construction project to track another individual's interactions with the rendered 3D model. For instance, while viewing the rendered 3D model of the construction project, a given individual may interact with a physical element (e.g., walls, ducts, etc.) represented in the 3D model of the construction project. The given individual may interact with the physical element for various reasons. For example, the given individual may interact with the physical element to identify and/or resolve a coordination issue associated with the physical element, which may involve viewing (or perhaps modifying) attributes associated with the physical element, taking measurements of the physical element, and/or marking up the physical element, among other possible interactions. While the given individual interacts with the physical element represented in the 3D model of the construction project, other individuals that are also viewing the rendered 3D model of the construction project may be able to track the given individual's interactions with the physical element in their respective views of the rendered 3D model, such that these individuals can view what physical element the given individual has interacted with and view any markups associated with the physical element.

As still another possibility, the collaboration tools may comprise a "sharing" tool that enables each individual viewing the rendered 3D model of the construction project to capture a view of the rendered 3D model and send the captured view to one or more other individuals. For instance, a given individual viewing the rendered 3D model of the construction project may interact with a physical element represented in the given individual's view of the rendered 3D model, use the sharing tool to take a screenshot of the view, and send the screenshot to one or more other individuals via an instant message, an email, and/or as part of a coordination issue that may be created by accessing a coordination tool via the given individual's client station.

As described in more detail below, each of the foregoing collaboration tools may take various forms and may be presented in various manners. Further, the collaboration tools that enable individuals to collaborate with one another may take various other forms as well.

Accordingly, in one aspect, disclosed herein is a method that involves (1) providing presence information to a first client station associated with a first individual that is viewing a first rendered 3D model of a construction project, wherein the presence information comprises (a) information identifying at least a second individual that is viewing a second rendered 3D model of the construction project via a second client station, and (b) an indication of a position and orientation at which the second rendered 3D model is being rendered, (2) receiving, from the second client station, an indication of a change in either the position or orientation at which the second rendered 3D model is being rendered, (3) updating the presence information based on the received indication, and (4) providing the updated presence information to at least the first client station.

In another aspect, disclosed herein is a computing system that includes at least one processor, a non-transitory computer-readable medium, and program instructions stored on the non-transitory computer-readable medium that are executable by the at least one processor such that the computing system is configured to carry out the functions disclosed herein, including but not limited to the functions of the foregoing method.

In yet another aspect, disclosed herein is a non-transitory computer-readable medium having program instructions stored thereon that executable such that a computing system is configured to carry out the functions disclosed herein, including but not limited to the functions of the foregoing method.

One of ordinary skill in the art will appreciate these as well as numerous other aspects in reading the following disclosure.

DETAILED DESCRIPTION

Figure 1:
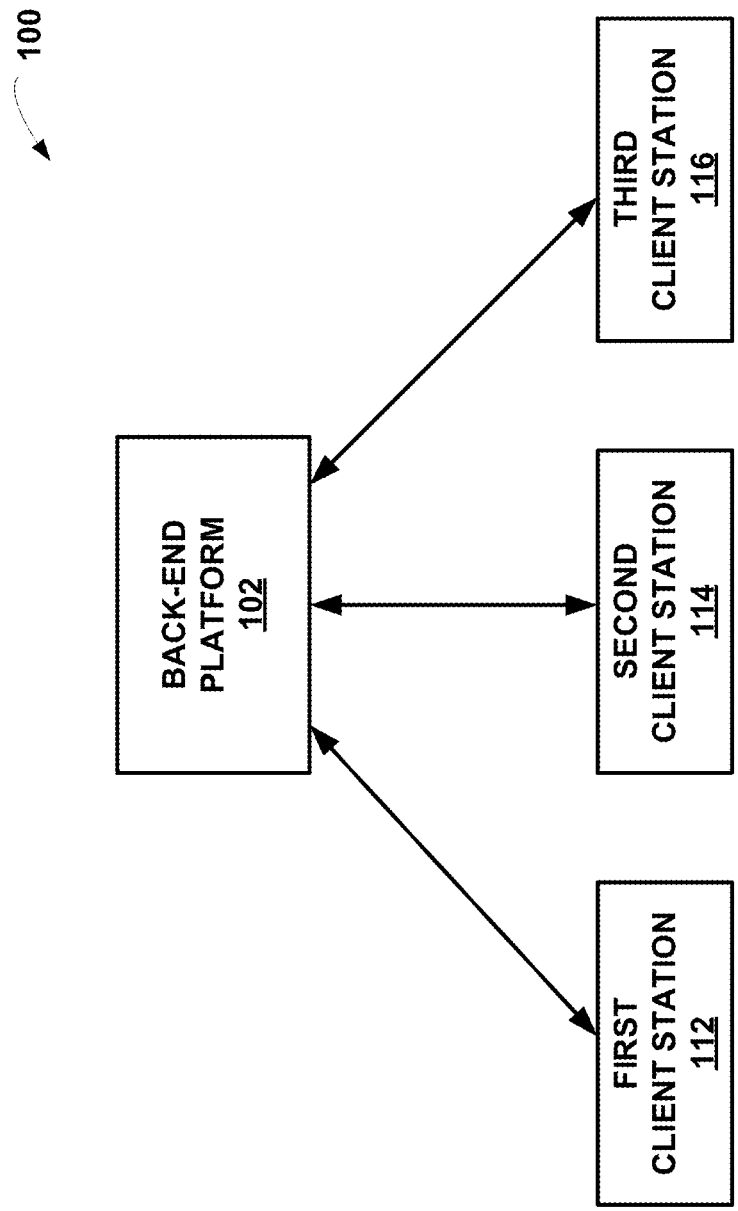
FIG. 1 depicts an example network configuration in which example embodiments may be implemented.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

As noted above, the present disclosure is directed to software technology that facilitates collaboration on a Building Information Modeling ("BIM") file by enabling multiple individuals to simultaneously access and make changes to the same BIM file. The disclosed software technology includes several features that promote efficient collaboration when multiple users are either simultaneously accessing a common BIM file (such as a scenario where multiple users are accessing the same BIM file, which may be stored in a common location like a network share location or a cloud storage location) or simultaneously accessing respective BIM files for the same construction project (such as a scenario where multiple users are accessing local copies of BIM files, where, in practice, the local copies may or may not be exact copies of the same BIM file, but are nonetheless for the same construction project).

At a high level, and in one respect, the disclosed software technology may function to provide "presence information." This presence information may include (1) information identifying each individual that is currently accessing a BIM file, and (2) an indication of how the other individual(s) are currently viewing a rendered 3D model using the BIM file, such as an indicator of another individual's respective position and/or orientation within a respective 3D model of the construction project. Further, as a given individual navigates through its own rendered 3D model, the presence information may be updated in order to track the given individual's updated position and/or orientation.

In another respect, but still at a high level, the disclosed software technology may include one or more collaboration tools, such as a "chat" tool, a "follow" tool, a "tracking" tool, and a "sharing" tool. These tools are described in more detail below.

In one aspect, the disclosed software technology may comprise a front-end portion that may be executed by one or more client stations and a back-end portion that may be executed by a back-end platform. In practice, the front-end portion of the disclosed software technology may be integrated into or otherwise interface with a software application, such as a BIM viewer. Further, in practice, the back-end portion of the disclosed software technology may determine when multiple individuals are accessing a common BIM file (or accessing respective BIM files for the same construction project). The back-end portion may also collect and maintain presence information for each individual accessing a common BIM file (or accessing respective BIM files for the same construction project), and each time the back-end portion collects, via a given individual's client station, an indication of a change to the given individual's position and/or orientation within a rendered 3D model of the construction project, the back-end portion may push updates to respective client stations of other individuals that are also rendering a 3D model of the construction project, so that each of these other individuals may be aware of where the given individual is located within the rendered 3D model of the construction project. Additional details of the interactions between the front-end portion and the back-end portion will be described further herein.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as client stations 112.

Broadly speaking, back-end platform 102 may comprise one or more computing systems that have been provisioned with software for carrying out one or more of the functions disclosed herein, including but not limited to providing presence information and/or facilitating collaboration between individuals viewing a rendered 3D model of a construction project. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the functions disclosed herein. Other implementations of back-end platform 102 are possible as well.

As further depicted in FIG. 1, back-end platform 102 is configured to interact with client stations 112, 114, 116 over respective communication paths. In this respect, each communication path between back-end platform 102 and one of client stations (e.g., client station 112) may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols. Although not shown, the respective communication paths between client stations 112, 114, 116 and back-end platform 102 may also include one or more intermediate systems. For example, it is possible that back-end platform 102 may communicate with a given client station (client station 112) via one or more intermediary systems, such as a host server (not shown). Many other configurations are also possible.

Although not shown in FIG. 1, back-end platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
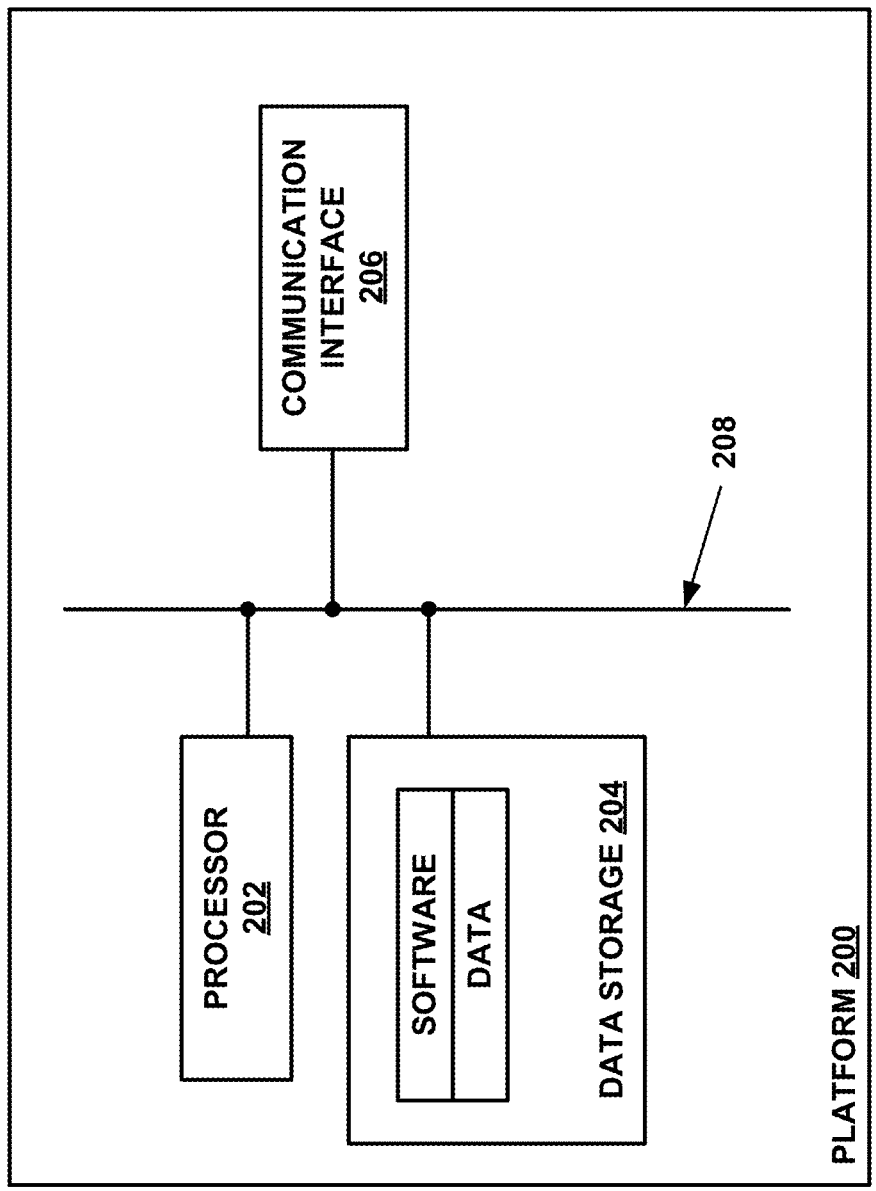
FIG. 2 depicts an example computing platform that may be configured carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store data in one or more databases, file systems, or the like. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE VISUAL REPRESENTATIONS OF CONSTRUCTION PROJECTS

As noted above, visual representations of a construction project tend to take one of at least two different forms. As one possibility, these visual representations may take the form of a two-dimensional ("2D") model of the construction project, where the 2D model may comprise a 2D technical drawing of the construction project, such as an architectural drawing, a construction blueprint, an engineering schematic, or the like. In general, the 2D model of the construction project may comprise 2D line segments that represent certain physical elements of the construction project (e.g., walls, ducts, etc.). In practice, the 2D model could be embodied in a computerized form, such as an image file (e.g., a PDF, JPEG, etc.), or some other computerized form that can be rendered by a client station (e.g., client station 112).

Figure 3:
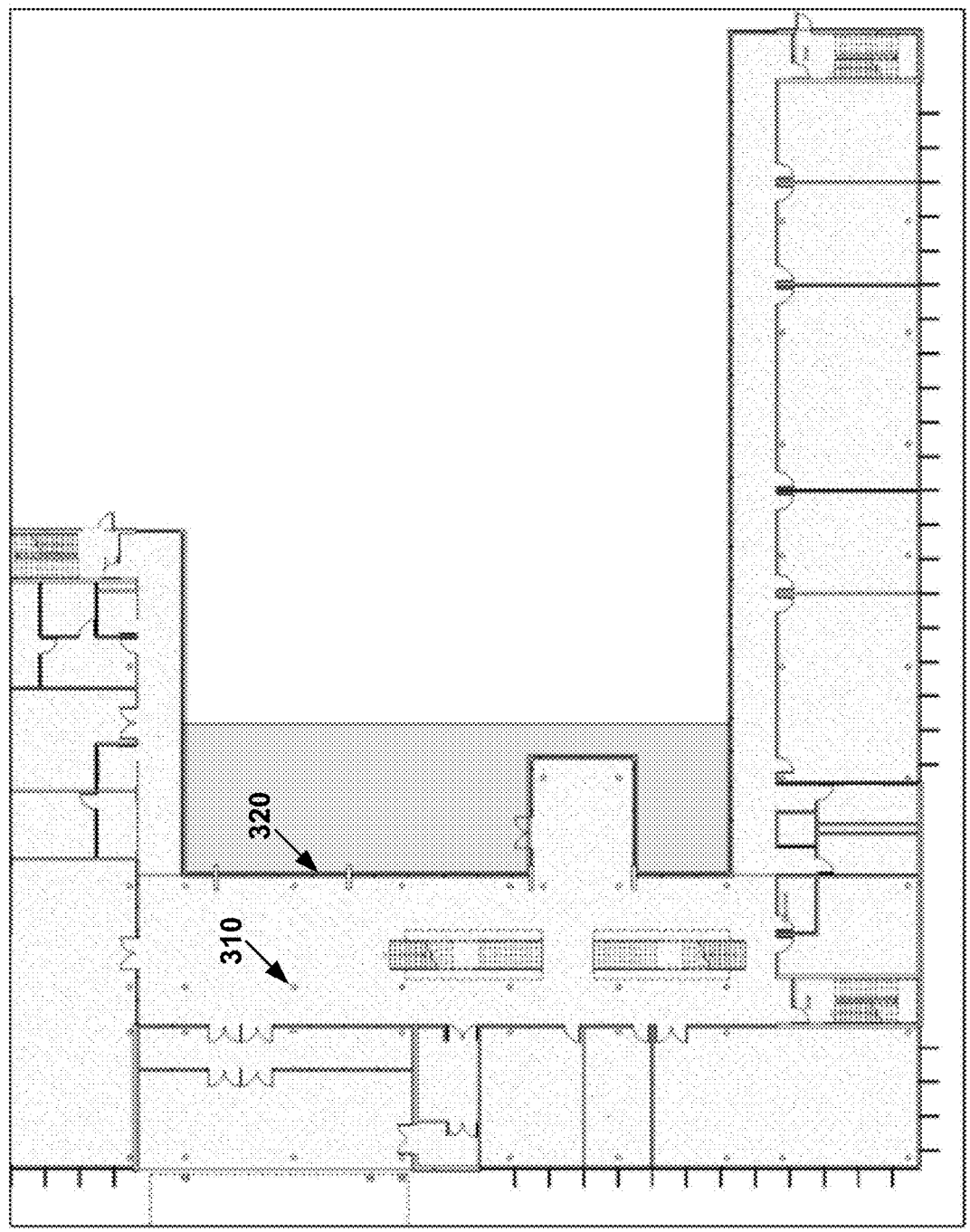
FIG. 3 depicts an example 2D model of a construction project in accordance with the present disclosure.

As one example to illustrate, FIG. 3 depicts an example 2D model 300 of a construction project (e.g., a building). As shown, 2D model 300 may take the form of an architectural drawing of a construction project that includes various 2D line segments that represent various physical elements of the construction project. For instance, 2D model 300 may include line segment 310 that may represent a given pillar that supports a building, and line segment 320 that may represent a particular wall of the building. As further shown in FIG. 3, 2D model 300 may include various other 2D line segments that are not numerically referenced as well.

Visual representations of a construction project may take other forms as well. As another possibility, as noted above, these visual representations may take the form of a computerized, 3D model of the construction project. In order to facilitate the creation and use of a computerized, 3D model of the construction project, one or more construction professionals (e.g., architects, designers, and/or engineers) may engage in a process referred to as Building Information Modeling ("BIM"). As a general matter, "BIM" refers to the process of designing and maintaining a computerized representation of physical and functional characteristics of a construction project, such as a commercial and/or residential building. More specifically, but still by way of example, when one or more construction professionals engage in BIM for a specific construction project, they generally produce what is referred to as a "BIM file." In essence, a "BIM file" is a computerized description of the individual physical elements associated with the construction project, including walls, floors, ceilings, pipes, ducts, and/or conduits, among other elements that are part of the physical structure and/or infrastructure of the construction project. Those skilled in the art will appreciate that what is referred to herein as a "BIM file" may, in practice, include or be comprised of multiple individual files.

This computerized description can include a vast amount of data describing the individual physical elements of the construction project and the relationships between these individual physical elements. For example, for an air duct designed to run across the first-floor ceiling of a building, a BIM file for this building may contain data describing how wide, how long, how high, and where, in relation to the other individual physical elements of the construction project, the duct is positioned. In this respect, the data describing the individual physical elements of the construction project and the relationships between these individual physical elements may take various forms.

As one possibility, a BIM file may include "mesh data" that comprises a mesh of geometric triangles that represents a scaled 3D model of the physical element. In this respect, mesh data corresponding to a given physical element may be used to derive the position, size, and/or shape of the given physical element within a 3D model. Specifically, each triangle of the mesh may represent a set of 3D coordinates. For instance, for each triangle of the mesh, the BIM file may contain data describing the coordinates of each vertex of the triangle (e.g., an x-coordinate, a y-coordinate, and a z-coordinate for the first vertex of the triangle; an x-coordinate, a y-coordinate, and a z-coordinate for the second vertex of the triangle; and an x-coordinate, a y-coordinate, and a z-coordinate for the third vertex of the triangle).

In practice, a mesh that represents a scaled model of a physical element may be comprised of thousands, tens of thousands, or even hundreds of thousands of individual triangles, where each triangle may have a respective set of three vertices and corresponding sets of coordinates for those vertices. However, one of ordinary skill in the art will appreciate that a mesh may comprise significantly fewer individual triangles as well.

As another possibility, a BIM file may include "bounding box" data. Conceptually, a "bounding box" is an imaginary box surrounding a mesh on all sides, with the edges of the bounding box being located at the outermost edges of the mesh. As such, the entire mesh may fit inside of this bounding box with no part of the mesh protruding from the bounding box. In this way, the bounding box may represent the maximum dimensions of the mesh in rectangular form, and thus, bounding box data corresponding to a given physical element may be used to derive an approximate position and/or size of the given physical element.

In practice, it may take less storage space to store bounding box data compared to mesh data. This is due to the fact that a mesh may comprise of many thousands of triangles in order to accurately represent the mesh's surface, which in some cases is irregular (e.g., the curved surface of a pipe), whereas a bounding box can typically be represented with just eight vertices of a rectangular box. Accordingly, in some instances, a client station running the disclosed software may operate in a mode designed to conserve processing power and/or storage space by rendering and/or overlaying a 3D model of the construction project that includes a bounding box as opposed to a mesh that represents a scaled model of a given physical element included in the 3D model. By doing so, the disclosed software can visually communicate a "low resolution" version of the construction project.

The data describing the individual physical elements of the construction project and the relationships between these individual physical elements may take various other forms as well.

As another possibility, a BIM file may include data describing the shape of each individual physical element in the construction project (e.g., an air duct). This shape data for each individual physical element in the construction project may take various forms. For instance, for each physical element in the construction project, the shape data may comprise data indicating the orientation of the physical element (e.g., vertical, horizontal, etc.), whether the physical element has a cylindrical, flat, and/or a long shape, among other possibilities.

As yet another possibility, a BIM may include additional data for each individual physical element of the construction project that may not be related to each physical element's specific size, position, and/or shape. For instance, for each individual physical element, this additional data may include data describing what system or sub-system the physical element is associated with (e.g., structural, plumbing, HVAC, electrical, etc.), data describing what material or materials the physical element is made of; what manufacturer the physical element comes from; what stage of manufacture the physical element is in; where the physical element currently resides (e.g., data indicating that the physical element is on a truck for delivery to the construction site, and/or once delivered, data indicating where at the construction site the delivered physical element resides); and/or various identification numbers assigned to the element (e.g., an object identification number, a serial number, part number, model number, tracking number, etc.), as well as others.

The data describing the individual physical elements of the construction project and the relationships between these individual physical elements may take various other forms as well.

In practice, the data describing the individual physical elements of the construction project and the relationships between these individual physical elements may be used for various purposes. For instance, a construction professional may use such data to identify a potential coordination issue and/or resolve a coordination issue. The data describing the individual physical elements of the construction project and the relationships between these individual physical elements may be used for various other purposes as well.

Figure 4:
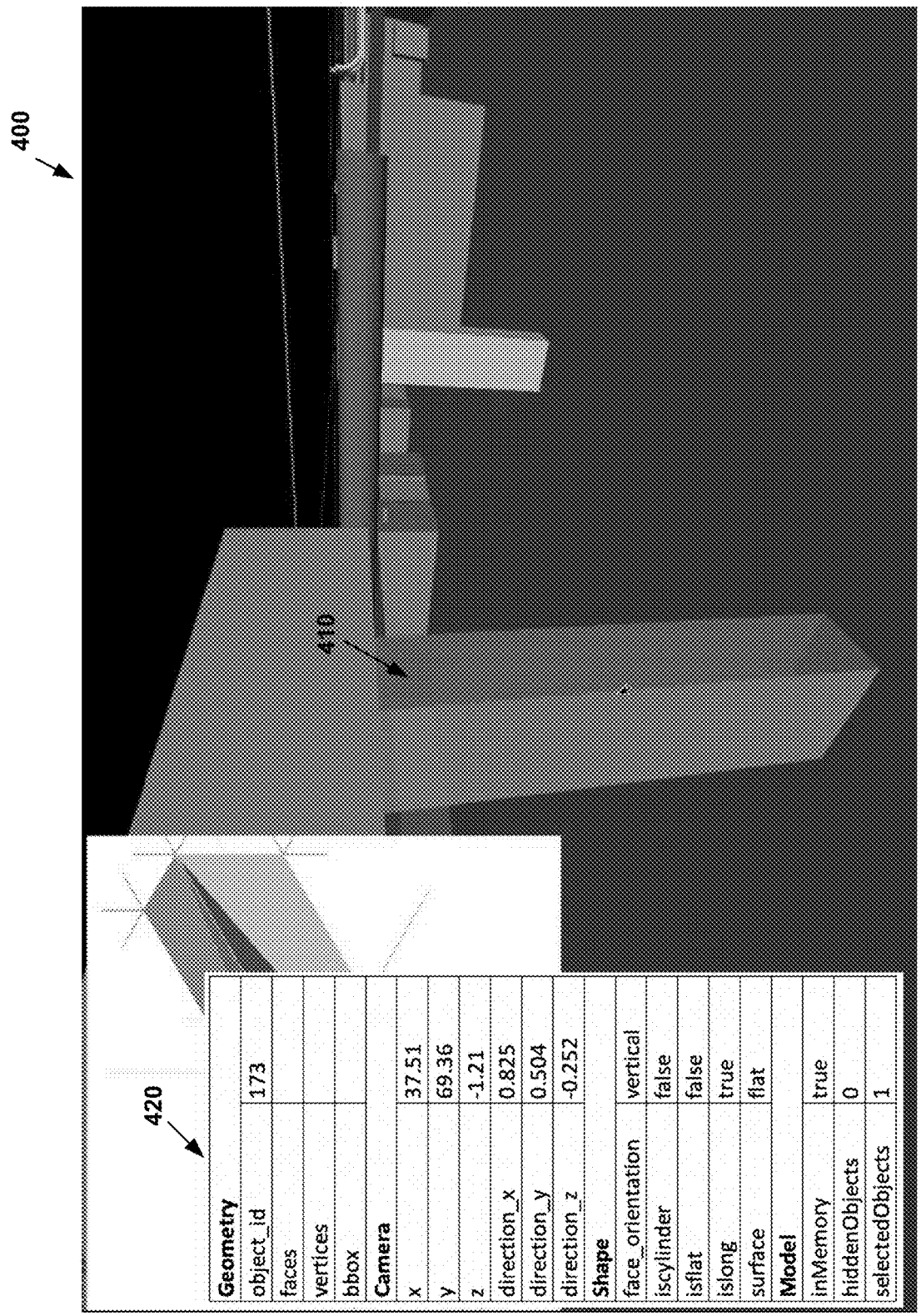
FIG. 4 depicts an example 3D model of a construction project in accordance with the present disclosure.

Turning to FIG. 4, an example view 400 of a rendered 3D model of a construction project that may be presented via a graphical user interface ("GUI") is depicted (which may be a 3D model of the same construction project represented by the 2D model 300 depicted in FIG. 3). As shown, view 400 may include various individual physical elements, such as physical element 410 that may represent a given pillar that supports a building being constructed. [0079] view 400 may also include graphical element 420 that is associated with physical element 410. In particular, graphical element 420 may include data describing physical element 410, such as data describing the size, position, and/or shape of physical element 410. For instance, as shown, graphical element 420 includes a set of coordinates (e.g., an x-coordinate, a y-coordinate, and a z-coordinate) for physical element 210. Graphical element 420 also includes shape data comprising (1) data indicating that physical element 410 has a vertical orientation (as indicated by a "face_orientation" field that is set to "vertical"), (2) data indicating that physical element 410 does not have a cylinder shape (as indicated by a "iscylinder" field that is set to "false"), (3) data indicating that physical element 410 does not have a flat shape (as indicated by a "isflat" field that is set to "false"), (4) data indicating that physical element 410 has a long shape (as indicated by a "islong" field that is set to "true"), and (5) data indicating that physical element 410 has a flat surface (as indicated by a "surface" field that is set to "flat"). Graphical element 420 may include various other data describing the size, position, and/or shape of physical element 410 as well.

As described above, it should be understood that graphical element 420 may include additional data for physical element 410 that not be related to its specific size, position, and/or shape.

Further, while only two forms of visual representations of a construction project have been described above (e.g., a 2D model and a 3D model of a construction project), it should be understood that visual representations of a construction project may take various other forms as well.

IV. EXAMPLE OPERATIONS

As described above, the present disclosure is generally directed to software technology that facilitates collaboration on a BIM file by enabling multiple individuals to simultaneously access and make changes to the same BIM file. The disclosed software technology includes several features that promote efficient collaboration when multiple users are either simultaneously accessing a common BIM file (such as a scenario where multiple users are accessing the same BIM file, which may be stored in a common location like a network share location or a cloud storage location) or simultaneously accessing respective BIM files for the same construction project (such as a scenario where multiple users are accessing local copies of BIM files, where, in practice, the local copies may or may not be exact copies of the same BIM file, but are nonetheless for the same construction project).

At a high level, and in one respect, the disclosed software technology may function to provide "presence information." This presence information may include (1) information identifying each individual that is currently accessing a BIM file, and (2) an indication of how the other individual(s) are currently viewing a rendered 3D model using the BIM file, such as an indicator of another individual's respective position and/or orientation within a respective 3D model of the construction project. Further, as a given individual navigates through its own rendered 3D model, the presence information may be updated in order to track the given individual's updated position and/or orientation.

In another respect, but still at a high level, the disclosed software technology may include one or more collaboration tools, such as a "chat" tool, a "follow" tool, a "tracking" tool, and a "sharing" tool. These tools are described in more detail below.

In one aspect, as noted above, the disclosed software technology may comprise a front-end portion that may be executed by one or more client stations (e.g., client stations 112, 114, 116) and a back-end portion that may be executed by a back-end platform (e.g., back-end platform 102). The one or more client stations 112, 114, 116 and back-end platform 102 may interact in various manners to collect, maintain, track, update, and/or present presence information.

For instance, each individual accessing the BIM file via a respective client station (e.g., client station 112, 114, or 116) may send an indication of the individual's presence information to back-end platform 102 via the respective client station. Back-end platform 102 may then maintain the presence information associated with each individual and send, to each individual's client station, (1) information identifying each individual that is currently accessing the BIM file, and (2) an indication of how the other individual(s) are currently viewing the rendered 3D model using the BIM file, such as an indicator of another individual's respective position and/or orientation within the 3D model of the construction project. Each time back-end platform 102 receives, from a respective individual's client station, an indication of a change in the respective individual's position and/or orientation within the rendered 3D model, back-end platform 102 may then update the presence information associated with the respective individual and send the updated presence information to the other individuals' client stations, such that each of these other individuals are aware of the respective individual's current position and/or orientation within the rendered 3D model of the construction project.

In accordance with the present disclosure, the presence information may take various forms. As one possibility, as noted above, the presence information may comprise information identifying each individual that is currently accessing a BIM file. For instance, for each individual that is currently accessing the BIM file to view a rendered 3D model of a construction project, the presence information may comprise the individual's name (e.g., first name, last name, user name, etc.), an image of the individual (e.g., a profile picture, etc.), a real-time video of the individual, and/or a visual indicator associated with the individual (e.g., an avatar, a color associated with the individual, or the like), among other examples.

It should be understood that the presence information may comprise other information identifying each individual that is currently accessing the BIM file as well. For instance, for each individual that is currently accessing the BIM file to render the 3D model of the construction project, the presence information may comprise an indication of the type of client station (e.g., a desktop, a smart phone, tablet, etc.) associated with the individual that is used to access the BIM file, an indication of where the individual's client station (and the individual) is physically located (e.g., city, street, etc.), and/or an indication of whether the individual is accessing the BIM file from a native application that embodies the disclosed software technology or a web-based application that embodies the disclosed software technology.

As another possibility, as noted above, the presence information may comprise an indication of how the other individual(s) are currently viewing the rendered 3D model, such as an indicator of another individual's respective position and/or orientation within the 3D model of the construction project. For instance, a first individual and a second individual may each access the same BIM file to render the 3D model of the construction project. While the first individual views the rendered 3D model of the construction project, the first individual's view of the rendered 3D model may comprise an indication of the second individual's position and/or orientation within the rendered 3D model. Likewise, while the second individual views the rendered 3D model of the construction project, the second individual's view of the rendered 3D model may comprise an indication of the first individual's position and/or orientation within the rendered 3D model of the construction project. In this respect, each individual's respective view of the rendered 3D model of the construction project may include a perspective at which the other individual is viewing the rendered 3D model of the construction project.

The presence information may comprise an indication of how the other individual(s) are currently viewing the rendered 3D model in other example scenarios as well, such as the scenario where multiple users are accessing respective BIM files.

The respective position and/or orientation of each individual that is currently accessing the BIM file may be presented in various manners. As one example, a first individual's view of the rendered 3D model of may include (1) a visual indicator of a second individual that is positioned at a location (and/or perhaps oriented in a direction) corresponding to the second individual's view of the rendered 3D model, and (2) a visual indicator of a third individual that is positioned at a location (and/or perhaps oriented in a direction) corresponding to the third individual's view of the rendered 3D model. Similarly, a second individual's view of the rendered 3D model of may include (1) a visual indicator of the first individual that is positioned at a location (and/or perhaps oriented in a direction) corresponding to the first individual's rendered view of the 3D model, and (2) a visual indicator of the third individual that is positioned at a location (and/or perhaps oriented in a direction) corresponding to the third individual's view of the rendered 3D model. Likewise, a third individual's view of the rendered 3D model may include (1) a visual indicator of the first individual that is positioned at a location (and/or perhaps oriented in a direction) corresponding to the first individual's view of the rendered 3D model, and (2) a visual indicator pf the second individual that is positioned at a location (and/or perhaps oriented in a direction) corresponding to the second individual's view of the rendered 3D model.

Generally speaking, the visual indicator of a given individual may take various forms, examples of which may include an avatar associated with the given individual, and/or an image associated with the given individual (e.g., a profile picture, an image with the given individual's initials, first name, last name, and/or user name, etc.). One of ordinary skill in the art will appreciate that the visual indicator associated with a given individual may take various other forms as well.

It should be understood that the respective position and/or orientation of each individual that is currently accessing the BIM file may be presented in various other manners as well.

Figure 5:
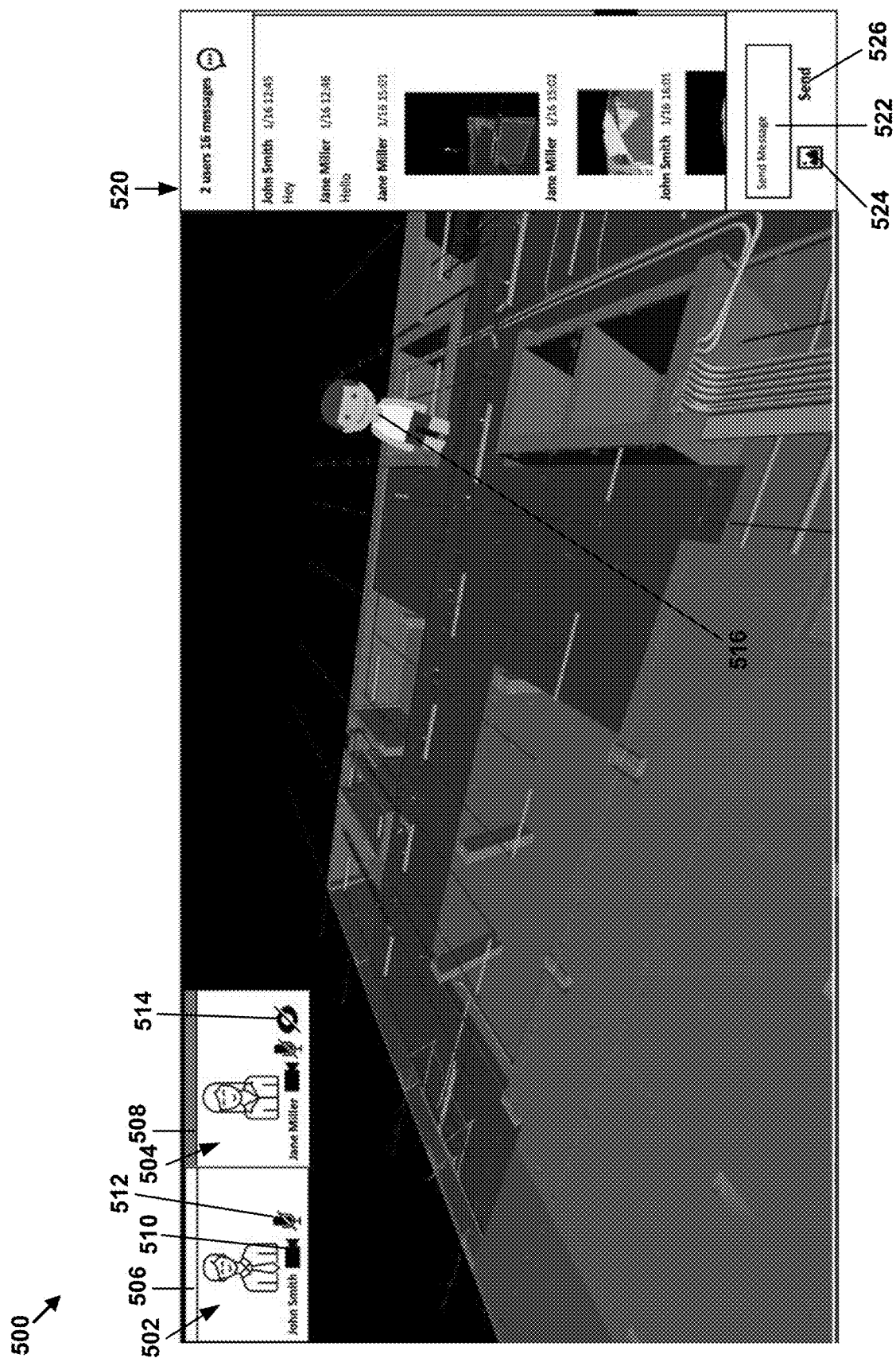
FIG. 5 depicts an example view of the disclosed software application that may be presented to a client station.

Turning to FIG. 5, an example view 500 of a rendered 3D model of a construction project that comprises presence information is shown. View 500 may be presented via a first individual's client station (e.g., client station 112), and view 500 may include information identifying each individual that is currently accessing the BIM file to view the rendered 3D model of the construction project via a respective client station.

In particular, view 500 may comprise window 504 that identifies information about the first individual, including the first individual's name (e.g., "Jane Miller") and an image of the first individual. View 500 may also comprise a color indicator 508 that is associated with the first individual (e.g., a shaded color). Similarly, view 500 may comprise window 502 that identifies information about a second individual, including the second individual's name (e.g., "John Smith") and an image of the second individual. View 500 may also comprise a color indicator 506 that is associated with the second individual (e.g., a white color).

As shown, view 500 presented via the first individual's client station (e.g., client station 112 operated by Jane Miller) may include an avatar 516 that represents the second individual (e.g., John Smith). Avatar 516 may include a color that matches color indicator 506 associated with the second individual in order to assist the first individual in identifying that avatar 516 represents the second individual. One of ordinary skill in the art will appreciate that avatar 516 may take various other forms and may include various other characteristics that may assist the first individual in identifying that avatar 516 represents the second individual.

As further shown in FIG. 5, avatar 516 that represents the second individual (e.g., John Smith) may be positioned and oriented in a direction that corresponds to the second individual's (e.g., John Smith's) view of the rendered 3D model of the construction project (which may be presented by the second individual's client station 114). In this respect, as the second individual navigates the 3D model of the construction project via the second individual's client station 114, the position and/or orientation of avatar 516 may change in rendered view 500, so as to inform the first individual where the second individual is positioned and/or oriented within the rendered 3D model of the construction project.

One of ordinary skill in the art will appreciate that rendered view 500 may include more or less information identifying an individual that is viewing a rendered 3D model of a construction project. For example, view 500 may also include an indication of whether an individual is accessing the BIM file to render the 3D model from a native application or a web-based application that embodies the disclosed software technology. For instance, window 502 may include an indication of whether the second individual named "John Smith" is accessing the BIM file to render the 3D model from a native application or a web-based application that embodies the disclosed software technology. As another example, when one or more additional individuals access the same BIM file to view the rendered 3D model of the construction project, view 500 may include information identifying each of these additional individuals as well. In this respect, view 500 may include more windows (which may be similar to window 502 and window 504), more color indicators (which may be similar to color indicator 506 and color indicator 508), and/or more avatars (which may be similar to avatar 516), where each additional avatar may be positioned and/or oriented at a respective position and/or orientation within the 3D model that corresponds to a respective individual's view of the rendered 3D model.

Further, one of ordinary skill in the art will appreciate that view 500 may present a position and/or orientation of a given individual within the 3D model of the construction project in various other manners as well. For instance, view 500 may include an inset that provides a 2D top-down view of the construction project as well as perhaps a rough indication of where each respective individual viewing the rendered 3D model of the construction project is positioned and/or oriented within the 3D model of the construction project.

In accordance with the present disclosure, the disclosed software technology may also include various collaboration tools that may be used by individuals to collaborate with one another. As noted above, the given individual may desire to collaborate with one or more other individuals for various reasons, such as to identify and/or resolve a coordination issue. To facilitate such collaboration, each individual's respective client station (e.g., client station 112, 114, or 116) may interact with a back-end platform (e.g., back-end platform 102) in various manners.

For instance, a given individual may send a request (or an indication) to back-end platform 102 via client station 112 to collaborate on some aspect of the BIM file with other individuals that are also accessing the same BIM file via their respective client stations (e.g., client stations 114, 116). Back-end platform 102 may then receive the request (or the indication), and send data to each of the other individuals' respective client stations (e.g., client stations 114, 116) to facilitate collaboration between these other individuals and the given individual.

Each individual's respective client station (e.g., client station 112, 114, or 116) may interact with the back-end platform (e.g., back-end platform 102) in various other manners as well, which may depend on the collaboration tools that are available.

As noted above, the collaboration tools may take various forms.

As one possibility, the collaboration tools may comprise a "chat" tool that enables each individual currently viewing the rendered 3D model of the construction project to chat with other individuals that also viewing the rendered 3D model of the construction project. The chat tool may take various forms.

As one example, while viewing the rendered 3D model of the construction project, the chat tool may enable each individual to video chat with one or more other individuals that are also viewing the rendered 3D model of the construction project. In this respect, the chat tool may enable real-time audio and/or video interactions between individuals to facilitate collaboration.

As another example, while viewing the rendered 3D model of the construction project, the chat tool may enable each individual to send messages to one or more individuals that are also viewing the rendered 3D model of the construction project. For instance, the chat tool may enable an individual to send instant messages to another individual viewing the rendered 3D model of the construction project (e.g., a direct message) and/or send instant messages to a group of individuals viewing the rendered 3D model of the construction project (e.g., a group message).

One of ordinary skill in the art will appreciate that the chat tool may take various other forms as well.

As another possibility, the collaboration tools may comprise a "follow" tool that may enable an individual viewing the rendered 3D model of the construction project to monitor another individual's view of the rendered 3D model. For instance, a first individual viewing the rendered 3D model of the construction project may access the follow tool to view the same view of the rendered 3D model as a second individual in which the first individual wishes to monitor, and as the second individual navigates the 3D model to a given location and/or orientation, the first individual's view of the rendered 3D model may be updated to a view that corresponds to that given location and/or orientation within the 3D model.

As yet another possibility, the collaboration tools may comprise a "tracking" tool that enables each individual viewing the rendered 3D model of the construction project to track another individual's interactions with the rendered 3D model. For instance, while viewing the rendered 3D model of the construction project, a given individual may interact with a physical element (e.g., walls, ducts, etc.) represented in the 3D model of the construction project. The given individual may interact with the physical element for various reasons. For example, the given individual may interact with the physical element to identify and/or resolve a coordination issue associated with the physical element, which may involve viewing (or perhaps modifying) attributes associated with the physical element, taking measurements of the physical element, and/or marking up the physical element, among other possible interactions. While the given individual interacts with the physical element represented in the 3D model of the construction project, other individuals that are also viewing the rendered 3D model of the construction project may be able to track the given individual's interactions with the physical element in their respective views of the rendered 3D model, such that these individuals can view what physical element the given individual has interacted with and view any markups associated with the physical element.

As still another possibility, the collaboration tools may comprise a "sharing" tool that enables each individual viewing the rendered 3D model of the construction project to capture a view of the rendered 3D model and send the captured view to one or more other individuals. For instance, a given individual viewing the rendered 3D model of the construction project may interact with a physical element represented in the given individual's view of the rendered 3D model, use the sharing tool to take a screenshot of the view, and send the screenshot to one or more other individuals via an instant message, an email, and/or as part of a coordination issue that may be created by accessing a coordination tool via the given individual's client station.

Each of the foregoing collaboration tools may take various forms and may be presented in various manners.

As one example to illustrate, referring back to FIG. 5, view 500 presented via the first individual's client station (e.g., client station 112 operated by "Jane Miller") may further comprise chat tools that enable the first individual to chat with the second individual who is also viewing the rendered 3D model the construction project via the second individual's client station (e.g., client station 114). For example, view 500 may include (1) window 520 that includes message box 522 that enables the first individual to input a message via the first individual's client station, and (2) send control button 526 to input an indication to send the message to the second individual. Window 520 may also include an indication of how many individuals are participating in a chat session (e.g., "2 users"), how many messages have been exchanged between the participating individuals (and/or perhaps an indication of how many unread messages the first individual has), and/or when each message was sent (e.g., a date and/or time at which each message was sent), as some non-limiting examples.

As another example, view 500 may include elements that enable real-time audio and/or video interactions between the first individual and the second individual and/or provide information about each individual's audio and/or video configuration settings. For instance, view 500 may include video indicator 510 that currently indicates that the second individual has enabled its camera, which perhaps may indicate that the second individual wishes to communicate with the first individual face to face. View 500 may also include audio indicator 512 that currently indicates that the second individual has disabled its microphone, which perhaps may indicate that the second individual has not configured its microphone and/or prefers not to participate in a voice chat with the first individual. Likewise, although not numerically referenced, view 500 may include a video indicator and/or an audio indicator associated with the first individual (e.g., the video indicator and the audio indicator in window 504).

One of ordinary skill in the art will appreciate that the video and audio indicator for each respective individual may take various other forms. Further, one of ordinary skill in the art will appreciate that while viewing the rendered 3D model of the construction project, each respective individual may change its audio and/or video configuration settings and/or input an indication to either enable or disable its respective camera and/or microphone at any given time.

As further shown in FIG. 5, view 500 presented via the first individual's client station (e.g., client station 112 operated by "Jane Miller") may further comprise follow indicator 514 that is associated with the first individual, which currently indicates that the first individual is not following any other individual that is also viewing the rendered 3D model of the construction project. While viewing the rendered 3D model of the construction project, the first individual may input an indication to follow another individual (e.g., the second individual) that is also viewing the rendered 3D model of the construction project (e.g., by selecting follow indicator 514 and/or accessing a menu (not shown), etc.), which may cause (1) follow indicator 514 to indicate that the first individual is following another individual, and (2) the 3D model in view 500 to update to a view that includes the same view of the rendered 3D model as the second individual's view of the rendered 3D model, which corresponds to the position and/or orientation of avatar 516 associated with the second individual. In this respect, as the second individual navigates the 3D model to a given location and/or orientation via the second individual's client station, the first individual's view of the 3D model may be updated to a view that corresponds to that given location and/or orientation within the 3D model of the construction project.

One of ordinary skill in the art will appreciate that follow indicator 514 may take various other forms. Further, although not shown in FIG. 5, one of ordinary skill in the art will appreciate that view 500 may also include a follow indicator associated with the second user (e.g., in window 502).

View 500 presented via the first individual's client station (e.g., client station 112 operated by "Jane Miller") may include various other collaboration tools as well. For example, although not shown in view 500, may include a tracking tool that enables the first individual to track the second individual's interactions with the rendered 3D model. For instance, while viewing the rendered 3D model of the construction project via the second individual's client station (e.g., client station 114), the second individual may interact with a physical element (e.g., walls, ducts, etc.) by viewing (or perhaps modifying) attributes associated with the physical element, taking measurements of the physical element, and/or marking up the physical element. In practice, the second individual may access various tools that enable the second individual to interact with the physical element. For example, the second individual may access a menu that includes tools to view attributes of the physical element, take measurements of the physical element, initiate creation of a coordination issue associated with the physical element, and/or make markups to the physical element, among other example tools. While the second individual interacts with the physical element, the first individual may be able to track the second individual's interactions with the physical element in view 500, such that the first individual can view what physical element the second individual has interacted with and view any markups associated with the physical element.

View 500 presented via the first individual's client station (e.g., client station 112 operated by "Jane Miller") may also include a sharing tool that enables the first individual to capture a view of the rendered 3D model and send the captured view to one or more other individuals (e.g., the second individual). For instance, view 500 may include an option to take a screenshot of the rendered 3D model in view 500 and send the captured view to the second individual by selecting attachment control button 524 that facilitates attaching the captured view to a message, and then sending the captured view to the second individual by inputting an indication to select send control button 526.

One of ordinary skill in the art will appreciate that the first individual may capture the view of the rendered 3D model and/or send the captured view in various other manners. One of ordinary skill in the art will also appreciate that the first individual may send the captured view (e.g., via an email) to various other individuals who may or may not be currently viewing the rendered 3D model of the construction project at a given time.

Further, one of ordinary skill in the art will appreciate that the foregoing collaboration tools may take various other forms and may be presented in various other manners. One of ordinary skill in the art will also appreciate that the disclosed software technology may enable individuals to invoke other software tools that facilitate collaboration with one another, such as a "Coordination Issue" tool that enables individuals to create a coordination issue and/or interact with a pending coordination issue that may need to be resolved.

As noted above, at a high level, the disclosed software technology may comprise a front-end portion that may be executed by one or more client stations (e.g., client stations 112, 114, 116) and a back-end portion that may be executed by a back-end platform (e.g., back-end platform 102). In practice, the front-end portion of the disclosed software technology may be integrated into or otherwise interface with a software application, such as the BIM viewer described above. Further, in practice, the back-end portion of the disclosed software technology may maintain the presence information, and each time the back-end portion receives, via a given individual's client station, an indication of a change to the given individual's position and/or orientation within a rendered 3D model of a construction project, the back-end portion may push updates to respective client stations of other individuals that are also rendering the 3D model of the construction project, such that each of these other individuals may be aware of where the given individual is located within the rendered 3D model of the construction project.

Figure 6:
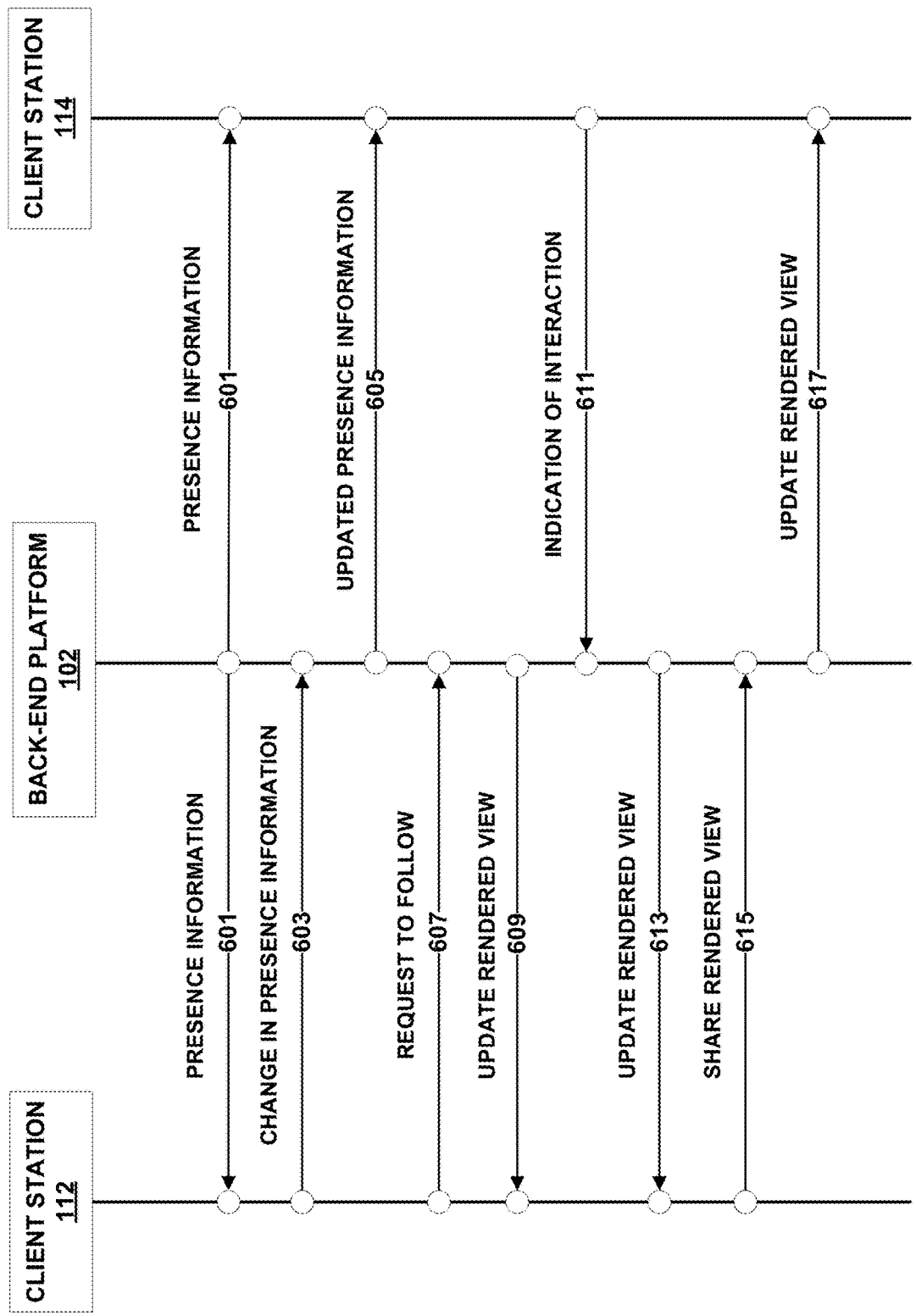
FIG. 6 depicts an example message flow diagram that illustrates some disclosed functions.

Turning to FIG. 6, an example message flow diagram that illustrates some example interactions between the front-end portion and the back-end portion is shown. For purposes of illustration, the example interaction is facilitated by (1) client station 112 that may be operated by the first individual (e.g., "Jane Miller" shown in FIG. 5), (2) client station 114 that may be operated by the second individual (e.g., "John Smith" shown in FIG. 5), and (3) back-end platform 102 that maintains presence information associated with the first individual and the second individual. However, it should be understood that other entities may carry out the example functions described below. Likewise, it should be understood that the disclosed process is merely described in this manner for the sake of clarity and explanation and that the interactions may be carried out in various other manners as well, including the possibility that functions may be added, removed, rearranged into different orders, combined into fewer blocks, and/or separated into additional blocks depending upon the particular embodiment.

In order to carry out the example interaction, the first individual may interact with client station 112 to access a BIM file and render a 3D model of a construction project. Likewise, the second individual may interact with client station 114 to access the same BIM file and render the 3D model of the construction project. Further, each individual accessing the BIM file may send an indication of the individual's presence information to back-end platform 102 via its respective client station (e.g., client station 112, client station 114).

At 601, back-end platform 102 may then maintain the presence information associated with the first individual and the second individual, and then send, to each individual's client station, (1) information identifying each individual that is currently accessing the BIM file, and (2) an indication of how the other individual is currently viewing the rendered 3D model, such as an indicator of the other individual's respective position and/or orientation within the 3D model of the construction project. In this respect, client station 112 may present a view of the rendered 3D model (e.g., view 500 of FIG. 5) that includes information identifying each individual and an indication of the second individual's position and/or orientation within the 3D model. Likewise, client station 114 may present a view of the 3D model that includes information identifying each individual and an indication of the first individual's position and/or orientation within the 3D model.

As the first individual navigates the 3D model of the construction project, the first individual's position and/or orientation within the 3D model may change. Accordingly, at 603, client station 112 may send an indication of the change in presence information (e.g., position and/or orientation) associated with the first individual, and back-end platform 102 may receive the indication of the change in presence information associated with the first individual. Back-end platform 102 may receive, from a client station, updates reflecting changes to presence information in various manners.

As one possibility, back-end platform 102 may receive the indication from client station 112 each time the first individual's position and/or orientation within the 3D model of the construction project changes as the first individual navigates the 3D model of the construction project. As another possibly, back-end platform 102 may periodically receive the first individual's position and/or orientation within the 3D model of the construction project, which in some instances may indicate a change in the first individual's position and/or orientation within the 3D model. As yet another possibility, back-end platform 102 may receive the indication from client station 112 after the first individual stops navigating the 3D model of the construction project for a given duration of time. Back-end platform 102 may receive the indication of the change in presence information (e.g., position and/or orientation) associated with the first individual at various other times as well.

At 605, back-end platform 102 may then update the presence information to include the updated position and/or orientation of the first individual within the 3D model, and send the updated presence information (e.g., the updated position and/or orientation of the first individual within the 3D model) to client station 114. Client station 114 may then present a view of the rendered 3D model to the second individual that includes the updated position and/or orientation of the first individual within the 3D model. In this respect, each time back-end platform 102 receives an indication of a change in presence information from a given client station (e.g., client station 112), back-end platform 102 may then push updated presence information to other client stations (e.g., client station 114) operated by respective individuals.

While rendering the 3D model of the construction project, each individual may utilize various collaboration tools provided by the disclosed software, which may then trigger various interactions between client stations 112, 114, and/or back-end platform 102.

As one example, while viewing the rendered 3D model of the construction project, the first individual may input a request via client station 112 to follow the second individual's view of the rendered 3D model. For instance, with reference to FIG. 5, the first individual may interact with follow indicator 514 (and/or perhaps interact with one or more other elements) to indicate that the first individual wishes to follow the second individual's view of the rendered 3D model.

At 607, client station 112 may then send the first individual's request to back-end platform 102 and back-end platform 102 may receive the request. One of ordinary skill in the art will appreciate that back-end platform 102 may receive the request at various times.

In turn, at 609, back end platform 102 may cause the first individual's client station 112 to present an updated view of the rendered 3D model that corresponds to the second individual's view of the rendered 3D model. In this respect, as the second individual navigates the 3D model to a given location and/or orientation via the second individual's client station 114, back end platform 102 may cause client station 112 to present an updated view that corresponds to that given location and/or orientation.

As another example, while viewing the rendered 3D model of the construction project, the second individual may interact with one or more physical elements represented in the 3D model via client station 114. For instance, the second individual may mark up a given physical element to identify a coordination issue associated with the given physical element.

At 611, client station 114 may then send an indication of the second individual's interaction with the given physical element and back-end platform 102 may receive the indication. One of ordinary skill in the art will appreciate that back-end platform 102 may receive the indication at various times.

In turn, at 613, back-end platform 102 may cause client station 112 to present an updated view of the rendered 3D model that may include one or more indications of the second individual's interactions with the given physical element, such that the first individual can track the second individual's interaction(s) with the given physical element. In this respect, each time a given individual (e.g., the second individual) interacts with a given physical element represented in the 3D model of the construction project, back-end platform 102 may cause another individual's client station (e.g., client station 112) to present an updated view of the rendered 3D model that may include indications of the given individual's interactions with the given physical element.

As yet another example, while viewing the rendered 3D model of the construction project, the first individual may capture the view of the rendered 3D model (e.g., view 500) and input an indication to share the captured view with the second individual. At 615, client station 112 may then send a request to share the captured view to back-end platform 102, and back-end platform 102 may receive the request. One of ordinary skill in the art will appreciate that back-end platform 102 may receive the request at various times.

In turn, at 617, back-end platform 102 may cause client station 114 to present an updated rendered view of the 3D model that may include the first individual's captured view of the 3D model. For instance, back-end platform 102 may cause client station 114 to present an updated rendered view of the 3D model that includes a screenshot of the first individual's captured view in a window that may be similar to window 520 of FIG. 5.

One of ordinary skill in the art will appreciate that while viewing the rendered 3D model of the construction project, each individual may interact with various other collaboration tools to collaborate with one another, which may then trigger various other interactions between client station 112, 114, and/or back-end platform 102. For instance, while viewing the rendered 3D model of the construction project, the first individual may input an indication to send an instant message to the second individual (e.g., by selecting second control button 526). Client station 112 may then send the indication to back-end platform 102, and back-end platform 102 may then send the instant message to the second individual's client station 114. Similarly, while viewing the rendered 3D model of the construction project, the first individual may input an indication to initiate a voice call with the second individual. Client station 112 may then send the indication to back-end platform 102, and back-end platform 102 may then send a notification to the second individual's client station 114 that the first individual has initiated a voice call with the second individual.

One of ordinary skill in the art will also appreciate that back-end platform 102 and client stations 112 and 114 may interact in various other manners and/or exchange various other data as well. For instance, in an implementation where the BIM file is maintained by back-end platform 102 (instead of client stations 112 and 114 accessing local copies of the BIM file), each time back-end platform 102 receives an indication of a change in presence information from a given client station, back-end platform 102 may update the presence information (e.g., to include an updated position and/or orientation of a given individual within the 3D model) and send an updated view of the 3D model of the construction project that comprises the updated presence information to the other individual.

V. CONCLUSION

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users," "individuals," or other entities, this is for purposes of example and explanation only. The claims should not be construed as requiring action by such actors unless explicitly recited in the claim language.

The invention claimed is:

1. A computing platform comprising:
   at least one processor;
   at least one non-transitory computer-readable medium; and
   program instructions stored on the at least one non-transitory computer-readable medium that are executable by the at least one processor such that the computing platform is configured to:
      determine that a plurality of client stations each associated with a respective user are concurrently rendering a three-dimensional (3D) model of a given construction project;
      provide, to each client station, respective presence information indicating (i) an identification of the respective user associated with each other client station concurrently rendering the 3D model, and (ii) a respective position and orientation at which each other client station is rendering the 3D model;
      based on the respective presence information, cause each client station to display a view that includes (i) a representation of the respective user associated with each other client station concurrently rendering the 3D model and (ii) an indication of the respective position and orientation at which each other client station is rendering the 3D model;
      receive, from a first client station of the plurality of client stations, an indication of a change in one or both of the position or orientation at which the first client station is rendering the 3D model;
      based on the indication, update the respective presence information; and
      based on updated respective presence information, cause at least a second client station of the plurality of client stations to display an updated view that reflects the change in one or both of the position or orientation at which the first client station is rendering the 3D model.

2. The computing platform of claim 1, further comprising program instructions stored on the at least one non-transitory computer-readable medium that are executable by the at least one processor such that the computing platform is configured to:
   before providing the respective presence information to each client station, receive respective initial presence information from each of the plurality of client stations.

3. The computing platform of claim 1, further comprising program instructions stored on the at least one non-transitory computer-readable medium that are executable by the at least one processor such that the computing platform is configured to:
   before causing the second client station to present the updated view that reflects the change in one or both of the position or orientation at which the first client station is rendering the 3D model, provide the updated respective presence information to at least the second client station.

4. The computing platform of claim 1, wherein the representation of the respective user associated with each other client station concurrently rendering the 3D model comprises one or more of (i) a name of the respective user, (ii) a visual indicator of the respective user, or (iii) a real-time video of the respective user.

5. The computing platform of claim 4, wherein the indication of the position and orientation at which each other client station is rendering the 3D model comprises the representation of the respective user being positioned at the position and orientation at which the other client station is rendering the 3D model.

6. The computing platform of claim 1, wherein the respective presence information further comprises, for each other client station concurrently rendering the 3D model, one or more of (i) a client station type, (ii) a physical location associated with the client station, or (iii) a type of application that is being used to access the 3D model.

7. The computing platform of claim 1, further comprising program instructions stored on the at least one non-transitory computer-readable medium that are executable by the at least one processor such that the computing platform is configured to:
   detect a request from the first client station to monitor a respective view being displayed by the second client station; and
   based on the request, cause the first client station to display a view that corresponds to the respective view being displayed by the second client station.

8. The computing platform of claim 1, further comprising program instructions stored on the at least one non-transitory computer-readable medium that are executable by the at least one processor such that the computing platform is configured to:
   detect a request from a given client station of the plurality of client stations to initiate a chat with each other client station concurrently rendering the 3D model; and
   based on the request, facilitate the chat between the plurality of client stations.

9. The computing platform of claim 1, further comprising program instructions stored on the at least one non-transitory computer-readable medium that are executable by the at least one processor such that the computing platform is configured to:
   detect a request from a given client station of the plurality of client stations to share a captured portion of the 3D model; and
   based on the request, cause each other client station of the plurality of client stations to display the captured portion of the 3D model.

10. The computing platform of claim 1, further comprising program instructions stored on the at least one non-transitory computer-readable medium that are executable by the at least one processor such that the computing platform is configured to:
- determine an interaction between the respective user of a given client station of the plurality of client stations and a given physical element in the 3D model;
- update the respective presence information to include information about the interaction; and
- cause each other client station of the plurality of client stations to display an indication of the interaction between the respective user of the given client station and the given physical element.

11. The computing platform of claim 10, wherein the interaction comprises creating a new coordination issue related to the given physical element, and wherein the indication of the interaction comprises a representation of the new coordination issue related to the given physical element.

12. A non-transitory computer-readable medium, wherein the non-transitory computer-readable medium is provisioned with program instructions that, when executed by at least one processor, cause a computing platform to:
- determine that a plurality of client stations each associated with a respective user are concurrently rendering a three-dimensional (3D) model of a given construction project;
- provide, to each client station, respective presence information indicating (i) an identification of the respective user associated with each other client station concurrently rendering the 3D model, and (ii) a respective position and orientation at which each other client station is rendering the 3D model;
- based on the respective presence information, cause each client station to display a view that includes (i) a representation of the respective user associated with each other client station concurrently rendering the 3D model and (ii) an indication of the respective position and orientation at which each other client station is rendering the 3D model;
- receive, from a first client station of the plurality of client stations, an indication of a change in one or both of the position or orientation at which the first client station is rendering the 3D model;
- based on the indication, update the respective presence information; and
- based on updated respective presence information, cause at least a second client station of the plurality of client stations to display an updated view that reflects the change in one or both of the position or orientation at which the first client station is rendering the 3D model.

13. The non-transitory computer-readable medium of claim 12, wherein the non-transitory computer-readable medium is also provisioned with program instructions that, when executed by at least one processor, cause the computing platform to:
- before providing the respective presence information to each client station, receive respective initial presence information from each of the plurality of client stations.

14. The non-transitory computer-readable medium of claim 12, wherein the non-transitory computer-readable medium is also provisioned with program instructions that, when executed by at least one processor, cause the computing platform to:
- before causing the second client station to present the updated view that reflects the change in one or both of the position or orientation at which the first client station is rendering the 3D model, provide the updated respective presence information to at least the second client station.

15. The non-transitory computer-readable medium of claim 12, wherein the representation of the respective user associated with each other client station concurrently rendering the 3D model comprises one or more of (i) a name of the respective user, (ii) a visual indicator of the respective user, or (iii) a real-time video of the respective user.

16. The non-transitory computer-readable medium of claim 15, wherein the indication of the position and orientation at which each other client station is rendering the 3D model comprises the representation of the respective user being positioned at the position and orientation at which the other client station is rendering the 3D model.

17. The non-transitory computer-readable medium of claim 12, wherein the respective presence information further comprises, for each other client station concurrently rendering the 3D model, one or more of (i) a client station type, (ii) a physical location associated with the client station, or (iii) a type of application that is being used to access the 3D model.

18. A method carried out by a computing platform, the method comprising:
- determining that a plurality of client stations each associated with a respective user are concurrently rendering a three-dimensional (3D) model of a given construction project;
- providing, to each client station, respective presence information indicating (i) an identification of the respective user associated with each other client station concurrently rendering the 3D model, and (ii) a respective position and orientation at which each other client station is rendering the 3D model;
- based on the respective presence information, causing each client station to display a view that includes (i) a representation of the respective user associated with each other client station concurrently rendering the 3D model and (ii) an indication of the respective position and orientation at which each other client station is rendering the 3D model;
- receiving, from a first client station of the plurality of client stations, an indication of a change in one or both of the position or orientation at which the first client station is rendering the 3D model;
- based on the indication, updating the respective presence information; and
- based on updated respective presence information, causing at least a second client station of the plurality of client stations to display an updated view that reflects the change in one or both of the position or orientation at which the first client station is rendering the 3D model.

19. The method of claim 18, further comprising:
- before providing the respective presence information to each client station, receiving respective initial presence information from each of the plurality of client stations.

20. The method of claim 18, further comprising:
- before causing the second client station to present the updated view that reflects the change in one or both of the position or orientation at which the first client station is rendering the 3D model, providing the updated respective presence information to at least the second client station.

* * * * *